(12) United States Patent
Gupta et al.

(10) Patent No.: US 7,383,293 B2
(45) Date of Patent: *Jun. 3, 2008

(54) DATABASE BACKUP SYSTEM USING DATA AND USER-DEFINED ROUTINES REPLICATORS FOR MAINTAINING A COPY OF DATABASE ON A SECONDARY SERVER

(75) Inventors: Ajay Kumar Gupta, Fremont, CA (US); Karl Ostner, St. Wolfgang (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/931,007

(22) Filed: Oct. 31, 2007

(65) Prior Publication Data

US 2008/0077636 A1    Mar. 27, 2008

Related U.S. Application Data

(63) Continuation of application No. 10/659,628, filed on Sep. 10, 2003, now Pat. No. 7,330,859.

(51) Int. Cl.
*G06F 17/30* (2006.01)
(52) U.S. Cl. .................. 707/204; 707/202; 714/41
(58) Field of Classification Search ............... 707/204, 707/202, 102, 100, 1; 714/41
See application file for complete search history.

(56) References Cited

U.S. PATENT DOCUMENTS

| | | | |
|---|---|---|---|
| 5,241,648 A | 8/1993 | Cheng et al. | |
| 5,559,764 A | 9/1996 | Chen et al. | |
| 5,594,900 A * | 1/1997 | Cohn et al. | 707/202 |
| 5,941,999 A | 8/1999 | Matena et al. | |
| 6,065,018 A * | 5/2000 | Beier et al. | 707/202 |
| 6,144,999 A | 11/2000 | Khalidi et al. | |
| 6,226,651 B1 * | 5/2001 | Masuda et al. | 707/202 |
| 6,889,229 B1 * | 5/2005 | Wong et al. | 707/102 |
| 2003/0120635 A1 * | 6/2003 | Bousfield et al. | 707/1 |
| 2004/0030703 A1 * | 2/2004 | Bourbonnais et al. | 707/100 |
| 2004/0158588 A1 * | 8/2004 | Pruet, III | 707/204 |

OTHER PUBLICATIONS

IBM Technical Disclosure Bulletin: Reliable Tree Multicast with a Server Set of Indeterminate Size; vol. 38, No. 04, Apr. 1995; pp. 85-87.

(Continued)

*Primary Examiner*—Le Luu
(74) *Attorney, Agent, or Firm*—Rankin, Hill & Clark LLP

(57) ABSTRACT

In a database system having a primary server side (10) and a secondary server side (30), a high availability data replicator (26, 46) transfers log entries from the primary side (10) to the secondary side (30) and replays the transferred log entries to synchronize the secondary side (30) with the primary side (10). R-tree index transfer threads (54, 56) copy user-defined routines, the user defined index, and index databases deployed on the primary server side (10) to the secondary server side (30) and deploy the copied user-defined routines, reconstruct the user-defined index, and copy data pages on the secondary side (30) to make the user-defined index consistent and usable on the secondary side (30).

12 Claims, 3 Drawing Sheets

OTHER PUBLICATIONS

The Computer Society of the IEEE: Sixth Symposium of Reliability in Distributed Software and Database Systems; 1987; Mustaque Ahamad, et al. pp. 115-125.

CCGrid2002: 2nd IEEE/ACM International Symposium on Cluster Computing and the Grid; 2002; Vana Kalogeraki, et al.

LH RS: A High-Availability Scalable Distributed Data Structure using Reed Solomon codes; 2000; pp. 237-248; Witold Litwin, et al.

A New Approach to Developing and Implementing Eager Database Replication Protocols: ACM, Transactions on Database Systems, vol. 25, No. 3; Sep. 2000; pp. 334-354; Bettina Kemme, et al.

Serverless Network File Systems: SIGOPS; 1995; Thomas E. Anderson, et al.

* cited by examiner though. The present invention relates to the art of information processing. It finds particular application in high availability database systems employing range tree indexing, and will be described with particular reference thereto. However, the present invention is useful in other information storage environments that employ hot backup systems and user-defined indexing.

DATABASE BACKUP SYSTEM USING DATA AND USER-DEFINED ROUTINES REPLICATORS FOR MAINTAINING A COPY OF DATABASE ON A SECONDARY SERVER

This application is a continuation of prior application Ser. No. 10/659,628, filed Sep. 10, 2003 now U.S. Pat. No. 7,330,859.

BACKGROUND OF THE INVENTION

1. Field of the Invention

The present invention relates to the art of information processing. It finds particular application in high availability database systems employing range tree indexing, and will be described with particular reference thereto. However, the present invention is useful in other information storage environments that employ hot backup systems and user-defined indexing.

2. Description of Related Art

Database environments for businesses and other enterprises should have certain characteristics, including high reliability, robustness in the event of a failure, and fast and efficient search capabilities. High reliability includes ensuring that each transaction is entered into the database system. Robustness includes ensuring that the database is fault-tolerant, that is, resistant to hardware, software, and network failures. High reliability and robustness are important in many business settings where lost transactions or an extended server downtime can be a severe hardship, and can result in lost sales, improperly tracked or lost inventories, missed product deliveries, and the like.

To provide high reliability and robustness in the event of a database server failure, high availability data replicators are advantageously employed. These data replicators maintain a "hot backup" server having a duplicate copy of the database that is synchronized with the primary database deployed on a primary server. The primary server is ordinarily accessed by database users for full read/write access. Preferably, the secondary server handles some read-only database requests to help balance the user load between the primary and secondary servers. Database synchronization is maintained by transferring database log entries from the primary server to the secondary server. The transferred database logs are replayed on the secondary server to duplicate the corresponding transactions in the duplicate copy of the database. With such a data replicator, a failure of the primary server does not result in failure of the database system; rather, in the event of a primary server failure the secondary server takes over as a an interim primary server until the failure can be diagnosed and resolved. The secondary server can provide users with read-only access or with full read-write access to the database system during the interim.

Advantageously, high availability data replicators provide substantially instantaneous fail-over recovery for substantially any failure mode, including failure of the database storage medium or media, catastrophic failure of the primary server computer, loss of primary server network connectivity, extended network lag times, and the like. The secondary server is optionally geographically located remotely from the primary server, for example in another state or another country. Geographical remoteness ensures substantially instantaneous fail-over recovery even in the event that the primary server is destroyed by an earthquake, flood, or other regional catastrophe. As an added advantage, the secondary server can be configured to handle some read-only user requests when both primary and secondary servers are operating normally, thus balancing user load between the primary and secondary servers.

A problem can arise, however, in that high availability data replication is not compatible with certain database features that do not produce database log entries. For example, a range tree index (also known in the art as an R-tree index) includes user-defined data types and user-defined support and strategy functions. Employing an R-tree index or other type of user-defined index system substantially improves the simplicity and speed of database queries for certain types of queries. An R-tree index, for example, classifies multi-dimensional database contents into hierarchical nested multi-dimensional range levels based on user-defined data types and user-defined routines. A database query accessing the R-tree index is readily restricted to one or a few range levels based on dimensional characteristics of parameters of the database query. The reduced scope of data processed by the query improves speed and efficiency. Advantageously, the R-tree index is dynamic, with the user-defined routines re-classifying database contents into updated hierarchical nested multi-dimensional range levels responsive to changes in database contents.

The operations involved in creating the user defined routines defining the R-tree typically do not generate corresponding database log entries. As a result, heretofore R-tree indexes and other user-defined indexes have been incompatible with high availability data replication. Creation of the R-tree index user-defined routines occurs outside the database system and does not result in generation of corresponding database log entries. Hence, the R-tree index is not transferred to the duplicate database on the secondary server during log-based data replication, and subsequent database log entries corresponding to queries which access the R-tree index are not properly replayed on the secondary server.

One way to address this problem would be to construct the R-tree index entirely using database operations which create corresponding database log entries. However, constructing the user-defined routines within the strictures of logged database operations would substantially restrict flexibility of user-defined routines defining the R-tree index system, and may in fact be unachievable in certain database environments.

In another approach to overcoming this problem, identical copies of the user-defined routines defining the R-tree index are separately installed on the primary and secondary servers prior to initiating database operations. This solution has certain logistical and practical difficulties. The user-defined routines should be installed identically on the primary and secondary servers to ensure reliable and robust backup of database operations which invoke the R-tree index. Because the primary and secondary servers may be located in different cities, in different states, or even in different countries, ensuring identical installation of every user-defined routine of the R-tree on the two servers can be difficult. In the event of a fail-over, it may be necessary to repeat the installation of the user-defined routines on the failed server, further increasing downtime.

The present invention contemplates an improved method and apparatus which overcomes these limitations and others.

SUMMARY OF THE INVENTION

In accordance with one aspect of the invention, an indexing method is provided for use in a database including primary and secondary servers and a data replicator that copies database log entries from the primary server to the secondary server and updates the secondary server using the copied database log entries. A user-defined index of contents of the database is created on the primary server. The user-defined index includes at least user-defined routines and the creating includes at least some operations that do not produce database log entries. A lock on the user-defined index is obtained on the primary server, and a definitional data set containing information on the user-defined routines is constructed. The definitional data set is transferred from the primary server to the secondary server. Secondary user-defined routines are constructed on the secondary server based on the definitional data set. Contents of the user-defined index are transferred from the primary server to the secondary server as transferred contents. The transferred contents in combination with the secondary user-defined routines define a secondary user-defined index corresponding to the user-defined index created on the primary server. The lock on the user-defined index is removed.

In accordance with another aspect of the invention, a database backup system is disclosed for monitoring a database deployed on a primary server and for maintaining a copy of said database on a secondary server. A data replicator in operative communication with the primary and secondary servers copies database log entries from the primary server to the secondary server and updates the secondary server using the copied database log entries. A user-defined routines replicator in operative communication with the primary and secondary servers copies user-defined routines deployed on the primary server to the secondary server and deploys the copies of the user-defined routines on the secondary server.

In accordance with yet another aspect of the invention, an article of manufacture is disclosed comprising one or more program storage media readable by a computer and embodying one or more instructions executable by the computer to perform a method for maintaining a multi-dimensional index of contents of a database system. The database system includes a primary database deployed on a primary side, a secondary database deployed on a secondary side, and a data replication module replicating contents of the primary database to the secondary database by replaying database log entries of the primary database on the secondary side. After creation of the multi-dimensional index of contents and prior to executing database operations that access the multi-dimensional index of contents, an index replication process is performed, including: locking the multi-dimensional index on the primary side; copying the multi-dimensional index to the secondary side; and unlocking the multi-dimensional index on the primary side. After the performing of the index replication process, database operations that access the multi-dimensional index of contents are performed on the primary side and database log entries corresponding thereto are replayed on the secondary side. The replaying accesses the copy of the multi-dimensional index on the secondary side.

Numerous advantages and benefits of the invention will become apparent to those of ordinary skill in the art upon reading and understanding this specification.

BRIEF DESCRIPTION OF THE DRAWINGS

The invention may take form in various components and arrangements of components, and in various process operations and arrangements of process operations. The drawings are only for the purposes of illustrating preferred embodiments and are not to be construed as limiting the invention.

DETAILED DESCRIPTION OF THE PREFERRED EMBODIMENTS

Figure 1:
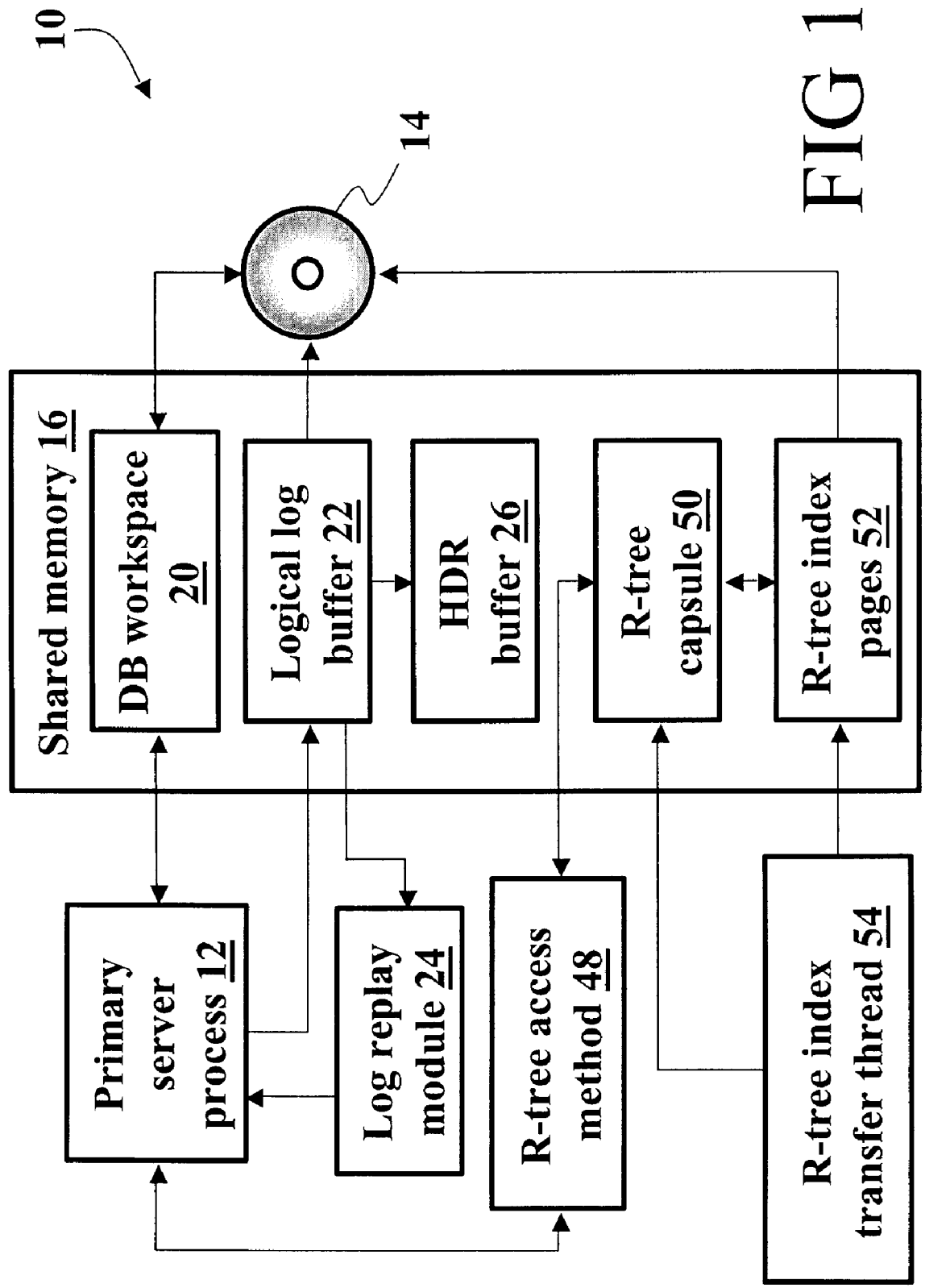
FIG. 1 shows a block diagram of a primary server side of a database system that employs high availability data replication with a range tree index.

With reference to FIG. 1, a primary server side 10 of a database system includes a primary server 12, which can be a server computer, mainframe computer, high-end personal computer, or the like. The primary server 12 maintains a primary database on a non-volatile storage medium 14, which can be a hard disk, optical disk, or other type of storage medium. The server 12 executes a suitable database system program, such as an Informix Dynamic Server program or a DB2 database program, both available from IBM Corporation, or the like, to create and maintain the primary database. The database is suitably configured as one or more tables describable as having rows and columns, in which database entries or records correspond to the rows and each database entry or record has fields corresponding to the columns. The database can be a relational database, a hierarchal database, a network database, an object relational database, or the like.

To provide faster data processing, portions of the database contents, or copies thereof, typically reside in a more accessible shared memory 16, such as a random access memory (RAM). For example, a database workspace 20 preferably stores database records currently or recently accessed or created by database operations. The server 12 preferably executes database operations as transactions each including one or more statements that collectively perform the database operations. Advantageously, a transaction can be committed, that is, made irrevocable, or can be rolled back, that is, reversed or undone, based on whether the statements of the transaction successfully executed and optionally based on other factors such as whether other related transactions successfully executed.

Rollback capability is provided in part by maintaining a transaction log that retains information on each transaction. Typically, a logical log buffer 22 maintained in the shared memory 16 receives new transaction log entries as they are generated, and the logical log buffer 22 is occasionally flushed to the non-volatile storage 14 for longer term storage. In addition to enabling rollback of uncommitted transactions, the transaction log also provides a failure recovery mechanism. Specifically, in the event of a failure, a log replay module 24 can replay transaction logs of transactions that occurred after the failure and which were not recorded in non-volatile storage or were otherwise lost, so as to recreate those transactions.

The commit/rollback arrangement provides enhanced reliability and robustness by avoiding failed transactions or combinations of transactions which could lead to inconsistent data in the database. To still further enhance reliability and robustness, the database system preferably provides a locking capability by which a transaction can acquire exclusive or semi-exclusive access to rows or records of the database involved in the transaction. Such locking preferably provides various levels of exclusivity or semi-exclusivity in accessing the locked rows. For example, a lock can prevent other transactions from both read and write access to the locked row, or can prevent only write access to the row by other transactions, or so forth. Locking enhances database reliability and robustness by reducing a likelihood of different transactions accessing the same row and creating inconsistent data in that row.

The described commit/rollback, log replay, and row locking mechanisms are exemplary techniques for enhancing reliability and robustness of the database on the primary server 10. Those skilled in the art can readily construct other mechanisms for ensuring integrity of data in the primary database stored and maintained on the primary side 10. However, such mechanisms do not protect against certain database failure modes. For example, the storage medium 14 could fail making stored database contents unreadable. Similarly, the server 12 could crash or its network connectivity could be lost, making the database on the primary side 10 inaccessible for an extended period of time.

Figure 2:
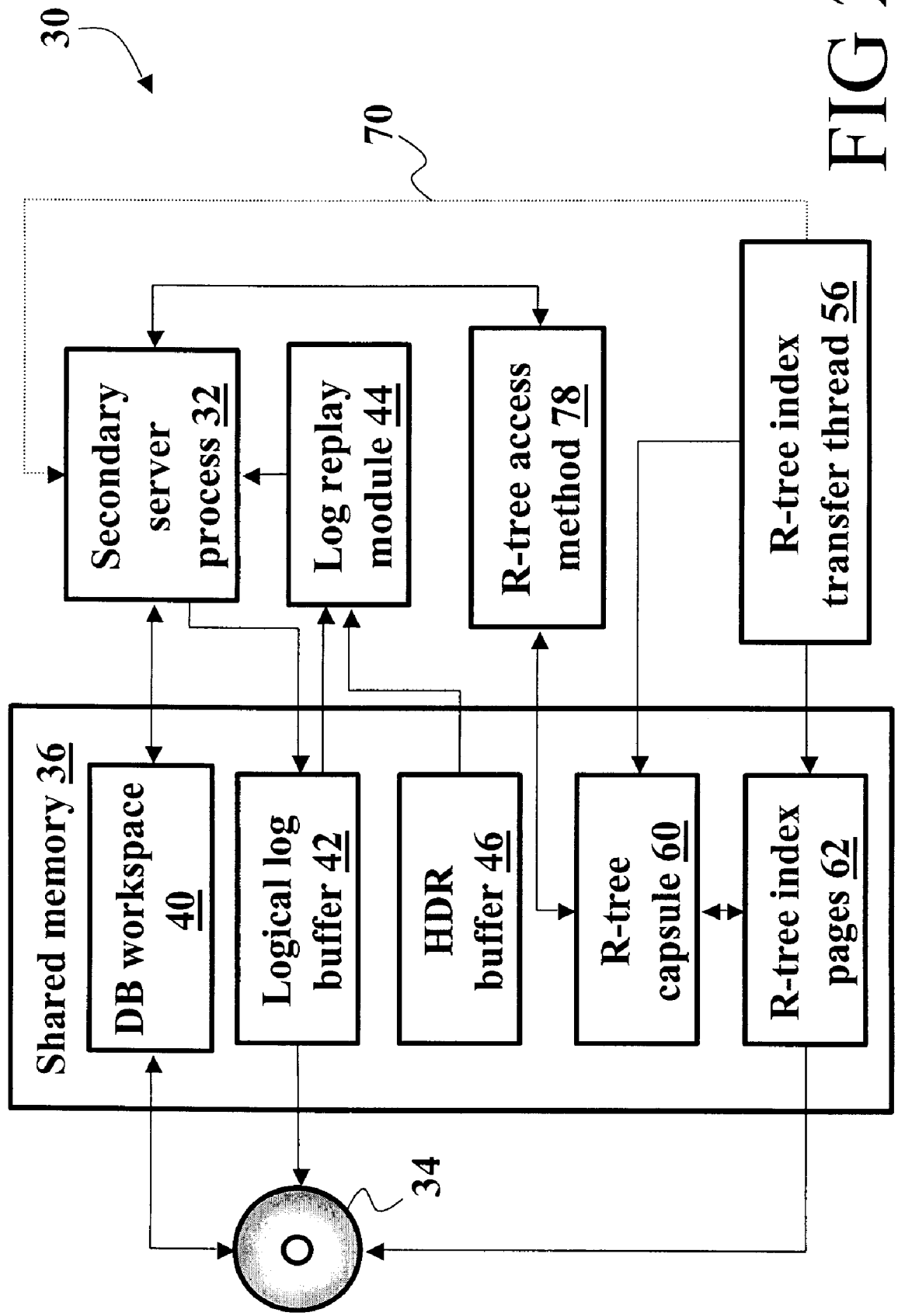
FIG. 2 shows a block diagram of a secondary server side of the database system.
Figure 3:
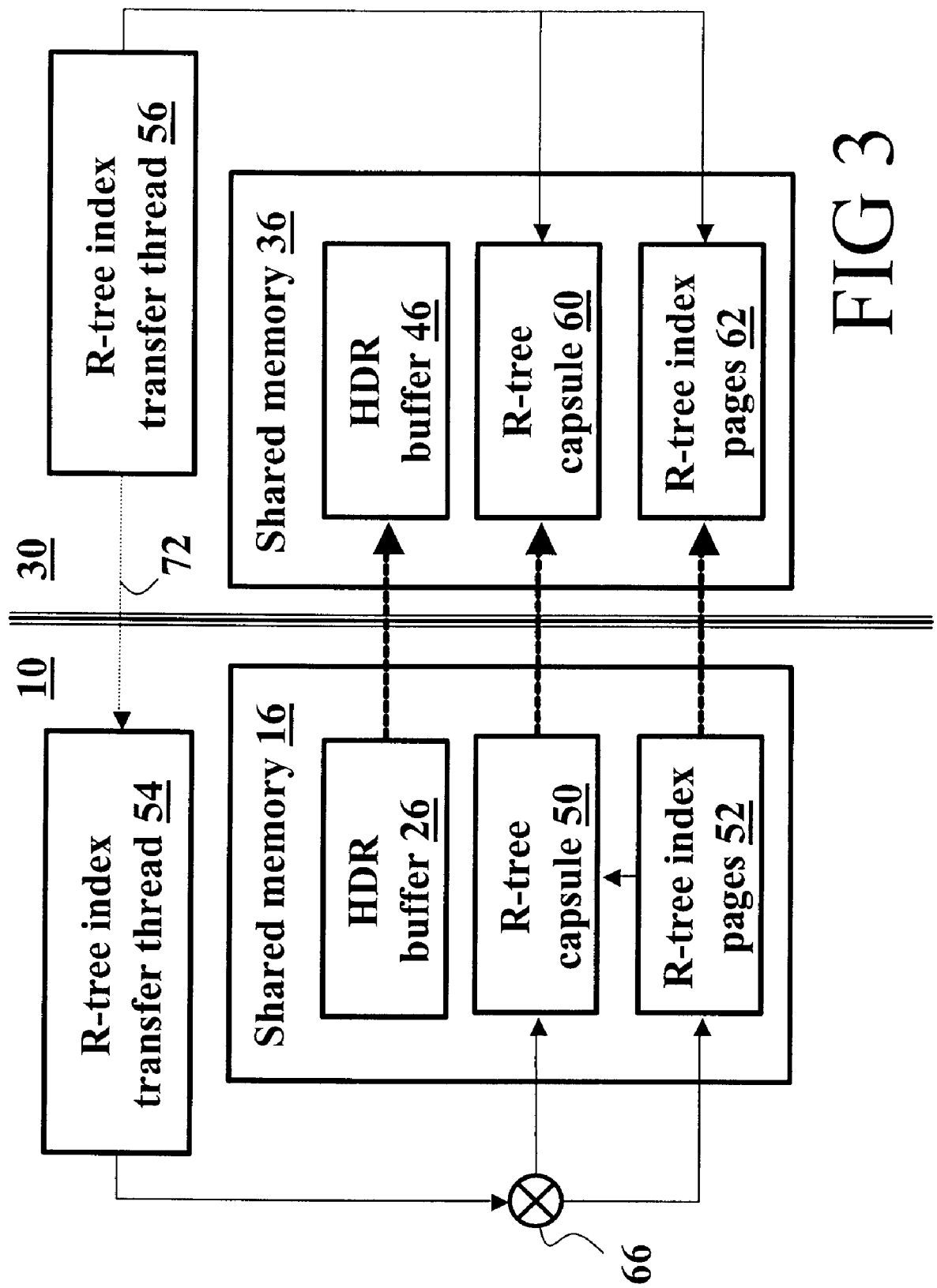
FIG. 3 shows a block diagram of data transfer processes for synchronizing the database including the range tree index on primary server side with the secondary server side.

With continuing reference to FIG. 1 and with further reference to FIGS. 2 and 3, to provide further reliability and robustness, a high availability data replicator is preferably provided. This replicator maintains a synchronized duplicate database on a secondary server side 30. As shown in FIG. 2, the secondary server side 30 includes a secondary server 32, non-volatile storage medium 34, a shared memory 36 containing a workspace 40 for the secondary database and a logical log buffer 42 holding transaction logs of transactions occurring on the primary server 10, and a log replay module 44. Preferably, the secondary side 30 is physically remote from the primary side 10. For example, the primary and secondary sides 10, 30 can be in different buildings, different cities, different states, or even different countries. This preferred geographical remoteness enables the database system to survive even regional catastrophes. Although geographical remoteness is preferred, it is also contemplated to have the primary and secondary sides 10, 30 more proximately located, for example in the same building or even in the same room.

The high availability data replicator includes a high availability data replicator (HDR) buffer 26 on the primary side 10 which receives copies of the data log entries from the logical log buffer 22. As indicated by a dotted arrow in FIG. 3, contents of the data replicator buffer 26 on the primary side 10 are occasionally transferred to a high availability data replicator (HDR) buffer 46 on the secondary side 30. As indicated in FIG. 2, on the secondary side 30, the log replay module 44 replays the transferred log entries stored in the replicator buffer 46 to duplicate the transactions corresponding to the transferred logs on the secondary side 30.

In a preferred embodiment, the logical log buffer 22 on the primary side 10 is not flushed until the primary side 10 receives an acknowledgment from the secondary side 30 that the log records were received from the data replicator buffer 26. This approach ensures that substantially no transactions committed on the primary side 10 are left uncommitted or partially committed on the secondary side 30 if a failure occurs. Optionally, however, contents of the logical log buffer 22 on the primary side 10 can be flushed to non-volatile memory 14 after the contents are transferred into the data replicator buffer 26.

In operation, users typically access the primary side 10 of the database system and interact therewith. As transactions execute on the primary side 10, transaction log entries are created and transferred by the high availability data replicator to the secondary side 30 where they are replayed to maintain synchronization of the duplicate database on the secondary side 30 with the primary database on the primary side 10. In the event of a failure of the primary side 10 (for example, a hard disk crash, a lost network connection, a substantial network delay, a catastrophic earthquake, or the like) user connections are switched over to the secondary side 30.

In one embodiment, the secondary side 30 takes over in a read-only capacity, providing users with access to database contents but not allowing users to add, delete, or modify the database contents. This approach is particularly suitable for short outages such as may be caused by network delays or other temporary loss of network connectivity. In another embodiment, the secondary side 30 takes over in a fully operational mode that provides both read and write access. This approach may be preferred when the primary side 10 is out of commission for a more extended period of time. As an added benefit, during periods of normal operation in which both the primary side 10 and the secondary side 30 are fully operational, the secondary side 30 preferably services some read-only user database queries, to advantageously balance user load between the primary and secondary sides 10, 30.

The primary side 10 also includes one or more user-defined indexes, such as an exemplary range tree (R-tree) index, which is a well-known indexing method supported, for example, by the Informix Dynamic Server program and the DB2 database program. The Informix Dynamic Server environment, for example, provides an R-tree access method 48 and a definition of a default R-tree operator class, rtree_ops.

To take advantage of R-tree indexing, user-defined data types and user-defined routines are typically defined to support a specific range tree index for a specific database topology. A range tree index includes hierarchical nested multi-dimensional range levels based on the user-defined data types and the user-defined routines. Preferably, the R-tree index is dynamic, with the user-defined routines re-classifying database contents into updated hierarchical nested multi-dimensional range levels responsive to addition, modification, or deletion of database content by a user.

The software used to generate and store the user defined routines generally involves operations other than database transactions. As a result, the operations generating and storing the user defined routines do not create corresponding transaction log entries, and so the log-based high availability data replicator does not transfer the user-defined routines that define a specific R-tree index to the secondary side 30.

For example, in the Informix Dynamic Server environment, the user-defined routines defining the R-tree index are stored on the primary side 10 as a definitional data set such as an R-tree capsule 50 residing in the shared memory 16. The R-tree index includes multi-dimensional range levels such as one or more root levels, branch levels, and leaf levels. Indexing information is stored in R-tree index pages 52. Those skilled in the art can readily construct other specific data storage structures for storing the user-defined routines and indexing information of the R-tree index. Regardless of the storage configuration, however, if some or all of the operations creating the R-tree index are not database transactions having corresponding transaction logs recorded in the logical log buffer 22, then the log-based data replication does not transfer this information to the secondary side 30.

To ensure accurate duplication of the database from the primary side 10 to the secondary side 30, an R-tree index transfer thread 54 executing on the primary side 10 cooperates with an R-tree index transfer thread 56 executing on the secondary side 30 to create a duplicate copy of the R-tree index information on the secondary side 30, including a duplicate R-tree capsule 60 and duplicate R-tree index pages 62.

In a preferred embodiment, the R-tree index transfer threads 54, 56 perform the R-tree index transfer as follows. The R-tree transfer thread 54 on the primary side 10 acquires a lock 66 on the R-tree index. This lock ensures that the R-tree index on the primary side 10 is not modified by some other process during the index transfer. The R-tree transfer thread 54 on the primary side 10 then acquires the R-tree capsule 50 by reading the capsule information from corresponding partition pages of the database workspace 20 belonging to the R-tree index, scans the capsule pages and transfers them from the primary side 10 to the secondary side 30, as indicated by the dotted arrow in FIG. 3. On the secondary side 30, the R-tree transfer thread 56 receives the capsule information and constructs a partition page in the shared memory 36 on the secondary side 30 to store the duplicate R-tree capsule 60.

The R-tree transfer thread 54 on the primary side 10 further acquires the R-tree index pages 52 by reading corresponding partition pages of the shared memory 16 of the primary side 10, scans the index pages and transfers them from the primary side 10 to the secondary side 30, as indicated by the dotted arrow in FIG. 3. On the secondary side 30, the R-tree transfer thread 56 receives the R-tree indexing information and constructs partition pages in the shared memory 36 on the secondary side 30 to store the duplicate R-tree index pages 62.

The R-tree transfer thread 56 on the secondary side 30 registers the R-tree index defined by the capsule and index pages 60, 62 by communicating registration information 70 to the secondary server 32 as indicated in FIG. 2. In the exemplary Informix Dynamic Server environment, for example, the R-tree transfer thread 56 on the secondary side 30 registers the R-tree index with the Informix Dynamic Server program. Once the R-tree index is created and is consistent on the secondary side 30, the R-tree transfer thread 56 on the secondary side 30 sends an acknowledgment 72 to the R-tree transfer thread 54 on the primary side 10, as indicated in FIG. 3. Responsive to receipt of the acknowledgment 72, the R-tree transfer thread 54 on the primary side 10 removes the lock 66 on the R-tree index.

The R-tree index transfer threads 54, 56 preferably operate to duplicate the R-tree index from the primary side 10 to the secondary side 30 at the time the R-tree index is created. Alternatively, if the high availability data replicator is started some time after the R-tree index is created, the R-tree index transfer threads 54, 56 preferably operate to duplicate the R-tree index from the primary side 10 to the secondary side 30 as part of initial startup of the high availability data replicator connection.

In any event, the R-tree index transfer threads 54, 56 should operate to duplicate the R-tree index from the primary side 10 to the secondary side 30 prior to execution of any database transaction that accesses the R-tree index. In this way, when a database transaction accesses the R-tree index through the R-tree access method 48 on the primary side 10, the transaction log entries of the database transaction are transferred to the secondary side 30 by the high availability log-based data replicator. The transferred log entries are replayed on the secondary side 30 by the log replay module 44. During the replaying of the log entry that accesses the R-tree index, an R-tree access method 78 references the contents of the duplicate R-tree capsule 60 and the R-tree index pages 62 on the secondary side 30 to carry out the transaction.

In the exemplary Informix Data Server, the R-tree access methods 48, 78 are provided by the Informix Dynamic Server environment. However, in other database system environments, the R-tree access method may be one of the user-defined routines, or may be a routine supplied separately from the database system server software. In these cases, the R-tree index transfer threads 54, 56 preferably transfer the R-tree access method along with the user-defined routines of the specific R-tree index, and the registration information 70 includes information for registering the R-tree access method with the secondary server 32.

In the illustrated embodiment, the high availability data replicator is a separate component from the R-tree index transfer threads 54, 56. However, it is also contemplated to integrate the R-tree index transfer threads 54, 56 with the high availability data replicator to define a unitary database backup system that provides the advantageous hot-backup capability of high availability data replication and that also encompasses hot-backup of the R-tree index.

High availability data replication that supports an R-tree index through the R-tree index transfer threads 54, 56 has been described. However, those skilled in the art will readily recognize that the described approach can be used to provide high availability data replication that supports other types of indexes employing user-defined routines that are not duplicated by a log-based data replicator. Still further, those skilled in the art will readily recognize that the approach can be used more generally to provide High availability data replication that supports substantially any type of user-defined routine that is accessed by the database system but that is created by operations that do not produce database transaction logs.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A database backup system for monitoring a database deployed on a primary server and for maintaining a copy of said database on a secondary server, the database backup system including:
   a data replicator in operative communication with the primary and secondary servers to copy database log entries from the primary server to the secondary server and to update the secondary server using the copied database log entries; and
   a user-defined routines replicator in operative communication with the primary and secondary servers to copy user-defined routines deployed on the primary server to the secondary server and to deploy the copied user-defined routines on the secondary server.

2. The database backup system as set forth in claim 1, wherein the user-defined routines define an R-tree index and the user-defined routines replicator includes:
   a lock mechanism for locking the R-tree index;
   a capsule extractor that retrieves stored encapsulated information about the user-defined routines defining the R-tree index and copies the retrieved encapsulated information over to the secondary server;
   an R-tree data extractor that retrieves R-tree index data and copies the retrieved R-tree data over to the secondary server; and
   an unlocking mechanism for unlocking the R-tree index.

3. The database backup system as set forth in claim 2, further including:
- a log replay module that replays the copied database log entries on the secondary server to effect update of the secondary server, the log replay module accessing the copied encapsulated information and the copied R-tree data responsive to replaying database log entries that call for accessing the R-tree index.

4. The database backup system as set forth in claim 1, wherein the user-defined routines define an R-tree index and the user-defined routines replicator includes:
- a first thread executing on the primary server that transmits the user-defined routines deployed on the primary server to the secondary server; and
- a second thread executing on the secondary server that receives and deploys the copied user-defined routines on the secondary server to create a copy of the R-tree index on the secondary server.

5. The database backup system as set forth in claim 4, wherein:
- the first thread locks the R-tree index on the primary server during the transmitting; and
- the second thread sends an acknowledgement to the first thread indicating that second thread received the user-defined routines, the first thread unlocking the R-tree index responsive to receipt of the acknowledgement.

6. The database backup system as set forth in claim 1, wherein the user-defined routines replicator is integrated into the data replicator to define a unitary database backup system.

7. An article of manufacture comprising one or more program storage media readable by a computer and embodying one or more instructions executable by the computer to perform a method for maintaining a multi-dimensional index of contents of a database system that includes a primary database deployed on a primary side, a secondary database deployed on a secondary side, and a data replication module replicating contents of the primary database to the secondary database by replaying database log entries of the primary database on the secondary side, the method including:
- after creation of the multi-dimensional index of contents and prior to executing database operations that access the multi-dimensional index of contents, performing in index replication process including:
  - locking the multi-dimensional index on the primary side,
  - copying the multi-dimensional index to the secondary side;
  - unlocking the multi-dimensional index on the primary side;
- wherein after the performing of the index replication process, database operations that access the multi-dimensional index of contents are performed on the primary side and database log entries corresponding thereto are replayed on the secondary side, the replaying accessing the copy of the multi-dimensional index on the secondary side.

8. The article of manufacture as set forth in claim 7, wherein the multi-dimensional index is a range tree index.

9. The article of manufacture as set forth in claim 8, wherein the copying of the range tree index to the secondary side includes:
- copying a capsule containing user-defined routines defining the range tree index to the secondary side.

10. The article of manufacture as set forth in claim 9, wherein the copying of the range tree index to the secondary side further includes:
- copying entries of the range tree index to the secondary side.

11. The article of manufacture as set forth in claim 7, wherein the performing of an index replication process further includes:
- registering the copy of the range tree index on the secondary side with the secondary database.

12. The article of manufacture as set forth in claim 11, wherein the secondary database system is selected from a group consisting of an Informix Dynamic Server and DB2 database.

* * * * *